United States Patent [19]

Dalzell

[11] 4,046,518

[45] Sept. 6, 1977

[54] SOLID FUEL ELEMENT AND PROCESS OF MANUFACTURING

[76] Inventor: Charles J. Dalzell, 920 N. 6th Ave., Yakima, Wash. 98902

[21] Appl. No.: 668,942

[22] Filed: Mar. 22, 1976

[51] Int. Cl.$^2$ .......................... C10L 5/00; C10L 11/00
[52] U.S. Cl. ...................................... 44/10 B; 44/24; 44/40; 44/41
[58] Field of Search ................. 44/1 E, 10 B, 6, 10 R, 44/24, 38, 40, 41

[56] References Cited

U.S. PATENT DOCUMENTS

| | | | |
|---|---|---|---|
| 926,449 | 6/1909 | Yampolsky | 44/10 B |
| 1,597,571 | 8/1926 | Beaudequin | 44/10 R |
| 3,297,419 | 1/1967 | Eyre, Jr. | 44/6 |
| 3,338,690 | 8/1967 | Calhoun | 44/6 |

*Primary Examiner*—Carl F. Dees
*Attorney, Agent, or Firm*—B. P. Fishburne, Jr.

[57] ABSTRACT

Fine sawdust obtained from compressed wood is homogeneously blended with an equivalent amount of liquid wax at a sufficiently elevated temperature to release substantially all moisture from the sawdust and to induce molecular activity in the wax and sawdust to cause full saturation of the compressed wood particles with wax. The hot blended material is cooled and milled to a highly uniform mix, followed by compaction of the material without adhesive additives into the finished product.

3 Claims, 5 Drawing Figures

SOLID FUEL ELEMENT AND PROCESS OF MANUFACTURING

BACKGROUND OF THE INVENTION

The world energy crisis heat greatly stimulated a demand for solid fuel products, both natural and articifical. A variety of artificial fireplace logs have been introduced ti the marketplace along with various igniting and kindling devices and materials. Solid fuel components in the prior art are made from a wide range of materials including paper, certain waste vegetable fibers and common sawdust and/or wood chips or shavings compounded with some form of adhesive binder prior to compressing the material into a simulated fireplace log or the like.

Prior art solid fuel elements made from common sawdust contain bound moisture in the wood cell structure as well as free moisture absorbed from the ambient atmosphere. Such prior art fuel products which employ some form of wax for ignition purposes utilize the wax merely as a coating on the wood particles and/or as a binder, usually with certain adhesive additives, such as starches. This is both costly and wasteful. The wood particles in the prior art products lack the ability to become saturated with wax because of retained moisture.

Therefore, the objective of this invention is to deal with and overcome the above and other deficiencies of the prior art by the provision of a greatly improved solid fuel product, particularly suitable for use as a solid igniter for fireplace logs and packaged artificial fuels, and also capable of a wider utility in the solid fuel field.

This invention recognizes and takes advantage of the fact that in certain compressed wood products made from kiln dried lumber chips and shavings bound mositure in the wood cells is reduced substantially to zero in the processing of the product. This is due to the high degree of compression employed, commonly about 55,000 psi. The subsequent increase in temperature and resulting molecular activity releases and drives out bound moisture from the wood cells as vapor or steam.

Under the unique process of this invention, a waste or by-product of compressed wood articles in the form of fine sawdust is utilized exclusively along with a certain refined liquid wax at a critical elevated temperature which assures the release of any free moisture which may have entered the wood particles from the ambient atmosphere in the interim. The hot wax elevates the temperature of the compressed wood particles to substantially the same temperature which existed during formation of the parent compressed wood product, and this again produces molecular activity and separation to create voids which become filled with the wax, as there is now a complete absence of both bound and free moisture in the wood particles and they are highly absorbent and are able to become fully saturated with the wax during the blending phase of the process, to be fully described.

The ultimate product of the invention is superior in many respect to the known prior art. For example, a 1 × 1-⅜ inches cylindrical igniter processed according to the invention has 20% of the burning time embodied in some prior art commonm sawdust artifical logs measuring 4 inches in diameter by about 14¼ inches long. The wood particles forming such prior art fuel elements are merely coated with wax or other petroleum derivative and are not saturated as with the invention and cannot become saturated because of the bound moisture retention of common sawdust.

With regard to the prior art, since the specific gravity of water is greater than the specific gravity of wax, the water or moisture can act only as a carrying agent or dispersant. A comparable example is the wax base water soluble oil in lapidary processes.

The product of the invention is not only completely moisture-free but also moisture repellent. It will float in water and can be submerged for a lengthy period of time and, upon removal from the water, will still ignite quite readily. Additionally, the product of the invention meets the Federal Clean Air standards whereas broadly comparable products in the prior art do not due to the presence of such contaminants as sodium nitrate, copper sulphate and other toxic materials.

According to another aspect of the invention process, the hot blended material is subjected to control cooling from two conditioned air sources whiel gradually passing through a cooling tower on multu-level conveyor which delivers the cooled material into a cold air stream near the bottom of the tower by means of which the material is air-borne for a time before gravitating into a collector chamber from which the cooled material is delivered to a storage bin, prior to passing through a hammer mill which imparts final uniformity to the material immediate prior to compression into the final product.

The final processing step is compression or compacting of the material into a solid igniter element or larger solid fuel component, in some cases. During the compression operation, additional fine compressed wood sawdust is employed as a release agent which allows easy separation of the product from the compression chamber or cylinder, without clogging, sticking or building up of material on the bottom of the compactor shaft. The use of this dry sawdust release agent avoids the necessity for constant cleaning of parts of absorbing the slight amount of melt at the ends of the solid igniter elements being formed under extreme pressure of approximately 22,000 psi. The release agent feature is important and critical to the success of the process in terms of commercial volume and automation.

Other features and advantages of the invention will appear during the course of the following detailed description.

BRIEF DESCRIPTION OF DRAWING FIGURES

DETAILED DESCRIPTION

The invention provides an improved solid fuel component particularly useful as an igniter element but also capable of wider utility in the field of solid fuels. The product is produced by a method which involves three basic parts or steps, namely, the blending of fine sawdust resulting from the cutting or grinding of compresed wood products with a certain refined wax at an elevated temperature, followed by controlled cooling of the blended material to create a very uniform mix, and finally the compaction or compression of the material into the finished product without additional additives, such as binders.

More particularly, the preferred sawdust by-product utilized in the invention is derived from slicing artificial fireplace logs with a 4,000 RPM carbide-tipped saw. The preferred compressed wood logs employed for making the sawdust are manufactured and sold by Weyerhaeuser Company of Tacoma, Wash. under the trademark PRES-TO-LOGS. Equivalent compressed wood products may also be used for the production of bound moisture free sawdust.

The parent compressed wood product, such as the above-noted artificial log, is made from chips and shavings of kiln dried lumber which can have a bound moisture content of 14%–15% maximum of total weight before processing by compression. During such processing, the chips and shaving are compressed to approximately 55,000 psi. As the bound moisture is trapped in the wood cells, the heat generated by compression causes molecular activity, expansion and separation.

The product under compression, when reaching a temperature of approximately 250° F., will be relieved of the bound moisture in its wood cells because of vapor pressure. During compaction or compression, a temperature of 350° F. to 400° F. is reached, and the natural wood fibers are cohesive until all bound moisture leaves as vapor. The finished product has substantially zero bound moisture.

The product, after ejection from the compression chamber, is still not and while cooling down to ambient storage temperature, it will absorb some free moisture up to a maximum of approximately 4% of total weight depending on relative humidity of the atmosphere during cooling. This amount of free moisture does not adversely affect a compressed artificial fire log but would not be tolerable in the processing of the solid fuel element embodying this invention. However, the compressed wood sawdust obtained from the above parent compressed wood product as a waste product may have a relatively small free moisture content depending upon the length of cooling time and/or storage time prior to sawing or grinding up to a maximum of 4%–5% of total weight. The sawdust will have substantially zero bound moisture, as explained. The actual processing of the solid fuel element begins, therefore, with the obtaining of a suitable supply of fine sawdust produced by sawing or grinding a compressed wood log or similar article.

Figure 1:
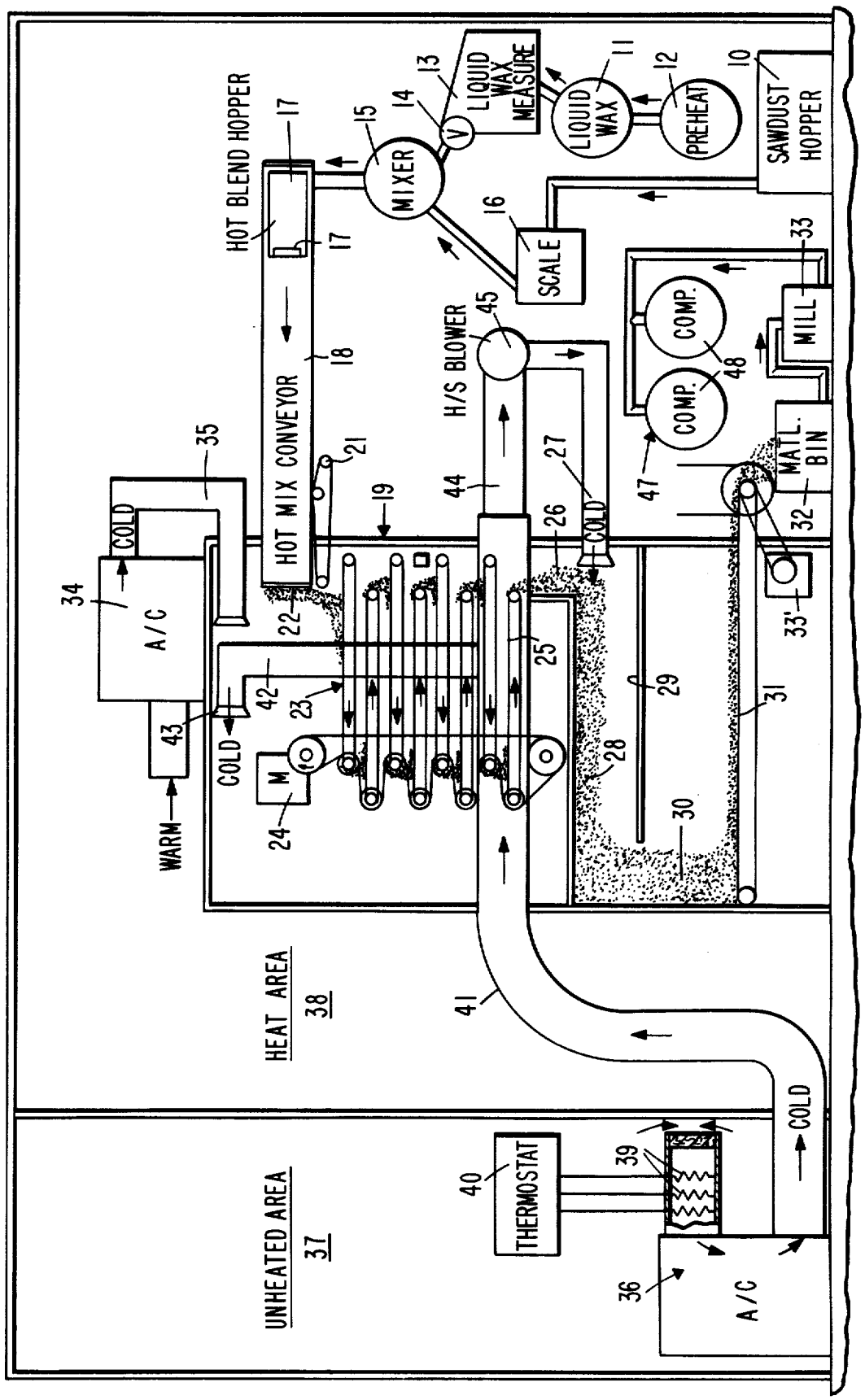
FIG. 1 is a schematic view of apparatus employed in the practice of the method according to the invention.

Referring to FIG. 1 of the drawings, which is a diagrammatic showing of apparatus employed in the process, the first essential step is to blend compressed wood sawdust contained in a sawdust hopper 10 with a high grade paraffin wax in the liquid state held in a tank 11 connected with a preheating unit 12 and delivering liquid wax at a temperature of approximately 350° F. to a wax measuring unit 13 connected through a flow control valve 14 to a mixer or blender 15, such as a Hobart 3-Speed Commercial Mixer. The preferred wax for usage in the process is ARISTOWAX 125, a refined paraffin wax having a melting point of 125° F. and sold in slab form by Union 76 Division of Union Oil Company of California, or an equivalent wax.

The compressed wood sawdust and preheated liquid wax at a temperature of 350° F. are blended in the mixer 15 in an approximate ratio of 1:1 by weight. The apparatus includes a weighing scale 16 for the sawdust at room temperature (65°–70° F.) prior to delivery into the mixer 15.

In actual practice, a measured weight of sawdust is placed in the mixing bowl with the bowl locked into position. The mixer paddle is then activated at low speed. An equivalent weight of the described wax in the liquid state at a temperature of 350° F. is then metered through the control valve 14 into the mixer bowl and blended with the sawdust. The flow control valve spreads the hot wax uniformly into the mixer paddle path and produces a homogeneous mixture of wax and sawdust in approximately four seconds, where four pounds of each component is employed as a mixed batch. During mixing, a slight foaming occurs caused by vaporization of the free moisture still present in the compressed wood sawdust. This free moisture is removed in the initial stage of the blending process. The liquid wax, being heated to 350° F., raises the temperature of the blended mixture to about 275° F., thus driving off all free moisture from the mixture.

After release of the free moisture, the speed of the mixer paddle is doubled to insure a loose uniform mix of sawdust and wax during the completion of the blending process.

During blending, the final temperature of the mixture levels off to approximately 250° F. which is the identical temperature encountered during the compression of the parent compressed wood product which freed the product of bound moisture. Therefore, at this renewed temperature of 250°, without any bound moisture present in the wood cells, the same are highly absorbent and the voids caused by molecular activity accept the liquid wax which completely fills the voids between wood cell molecules, and thus the wood particles are truly and completely saturated with the wax, as distinguished from being merely coated. In the complete absence of moisture, both bound and free moisture in the wood particles at this critical point, there is noting to prevent complete saturation with the liquid wax throughout the highly absorbent dry sawdust component of the mixture. While complete saturation is thus taking place during the blending operation in the mixer 15, the sawdust wood cells and liquid wax are at the same temperature, approximately 250°, as noted. Such saturation of wood particles with liquid wax could not be achieved if any moisture was present in the wood cells, because the specific gravity of water is greater than that of the liquid wax at any temperature, and since two liquids are involved in the process, the moisture or water content of the wood must be completely removed before it can accept the liquid wax molecules in the molecular voids.

A Saybolt Universal Second (S.U.S.) graph or curve for ARISTOWAX 125 is substantially flat in the temperature range of 125° F. to 350° F. Below 125° F., the viscosity curve is steeper. This means that rapid molecular separation in the wax occurs during heating up to 125° F., and above this temperature relatively little change occurs in terms of separation of the wax molecules. Instead, the wax molecules become more violent and in the liquid state of 350° F. are extremely violent. It is this violent wax molecule in liquid form which enters and fills the voids between molecules in the compressed wood sawdust, and as the temperature decreases, the two components become a homogeneous mass in substantially equal parts with the wood particles fully saturated with wax and not merely coated. It may be mentioned here that the particular wax has a flash and fire point well above 410° F., whereby the ultimate igniter element or other solid fuel element produced by the process can be ignited by an open flame.

At the completion of blending in the mixer 15, the first of the three essential process steps, the blended material consists of completely moisture-free particles which are completely saturated with wax and have acquired an increased mass in the same unit volume. The particle is lighter than water and will not absorb water. When subsequently compacted with like particles, it will not change in size or shape. It does not require an additive binder, such as starch or other common used binders, for proper adherence during compaction of the product. The particle is non-toxic prior to combustion.

It should be noted here that the ARISTOWAX 125 at the time of blending with the compressed wood sawdust must be in the liquid state at 350° F. plus or minus 5° F. If at a lesser temperature, the blended mixture does not attain enough heat initially and cools too rapidly and the finished material will contain some coated wood particles and some free wax, which is undesirable. If the liquid wax is too hot, it tends to oversaturate the sawdust particles, making the subsequent compaction step more difficult because of creating particles which are more solid. Thus, the temperature of the liquid wax, 350° F., is quite critical in the process.

EXAMPLE

Two cylinders, each 30 inches in height by 20 inches in diameter were employed to weigh compressed wood sawdust and when level full, each cylinder contained exactly 125 pounds of sawdust at 70° F. On this basis, a total volume of sawdust in the two cylinders was computed to be 10.908 cubic feet and this volume of sawdust divided into a total sawdust weight of 250 pounds in the two cylinders equaled 22.914 pounds of sawdust per cubic foot.

The ARISTOWAX 125 utilized in the example was obtained in slabs, each measuring 1.75 × 18.625 × 11.875 inches, with each slab weighing 11 pounds at 70° F. 16 slabs were employed in the example or 176 pounds of wax, or 6192.8 cubic inches of wax which equals 3.583 cubic feet of wax weighing 41.160 pounds per cubic foot at 70° F. The total weight of raw material employed was therefore 426 pounds.

The processed or blended material filled three cylinders each of which was 31 inches in height × 20 inches in diameter for a total weight of 413 pounds of material. The total volume of blended material was calculated to be 16.3625 cubic feet. Originally, as calculated, 10.908 cubic feet of compressed wood sawdust weighing 250 pounds at 22.914 pounds per cubic foot was employed. However, in the blended material, the calculated volume is 16.3625 cubic feet equal to 25.2406 pounds per cubic foot. Thus, in the blended material, there was a gain of 5.455 cubic feet and also a gain of 3.327 pounds per cubic foot or a gain in density.

In the above example, therefore, the wood cell has gained mass by absorbing the liquid wax, and has acquired more mass in the same unit volume. The total weight loss of 13 pounds (426 minus 413) was caused by the elimination of moisture from the sawdust, and although this is roughly 5% of total weight, it is reasonable, because the sawdust obtains some free moisture during sawing and storage as it cools to room temperature. In this connection, the compressed wood sawdust should not remain in open storage for a great length of time and, ideally, should be used immediately in the process of the invention. In all cases, it should be used in the process before attaining a temperature lower than room temperature to avoid absorbing too much free moisture.

However, since the critical point of blending of the sawdust and wax is when both are at 250° F., there is nothing to preclude using a hotter compressed wood particle and a heavier wax at a higher temperature in the invention; or a hotter particle with the same wax to produce a more dense or less dense blended mixture. Nevertheless, the described compressed wood and wax components at the noted temperatures are the most suited to meet the requirements of the invention.

The second essential process step is the cooling of the blended fine sawdust and liquid wax to a nearly perfect uniform consistency. Continuing to refer to FIG. 1, the blended material passes from the mixer 15 to a hopper 17 while still at an elevated temperature, and from this hopper, the hot mixture is transferred by a conveyor 18 where it travels at a uniform speed of about six feet per minute in a layer approximately ½ inches deep and 6 inches wide until it is transferred into a cooling hopper or tower 19. A control gate 20 of hopper 17 assures the proper depth and width of the hot material on the conveyor 18, as described. A speed control means 21 for the conveyor 18 allows its speed to be reduced to approximately four feet per minute in some instances.

The hot material conveyor 18 is elevated and is operating at room temperature (70° F.) which initiates some cooling and cases the material to enter the cooling hopper 19 at about 150° F. As the material enters the cooling hopper at 22, it is delivered onto an eight level belt conveyor means 23 driven by a gear head motor means 24 at a constant speed of about ten feet per minute.

The cooling conveyor belts are 10-¾ inches wide to accommodate the volume of blended material on the hot mix conveyor 18. As the material falls onto the cooling belt means 23, it starts to spread out to a lesser depth thereon due to the differences in speed between the two conveyors. As it spreads out into a thinner layer and moves with the belt means 23, it tends to cool quite rapidly, as a temperature of approximately 56° F. is maintained in the cooling hopper 19 by two air conditioning systems, to be described. Since the material cools quite rapidly, it is carried only about five feet on each pass of the conveyor means 23 before dropping to the next belt level and this dropping or descent continues to spread out the material which, in turn, increases cooling and eliminates caking during cooling. When the material falls from the lowest level 25 of the cooling conveyor belt means as at 26, it falls through a cold air blast from a conduit 27 and becomes air-borne at 28 for approximately eight feet within an enclosed rectangular passage 29 before falling into a collector bin 30 where it is constantly moved by another conveyor 31 to a material storage bin 32 preparatory to further processing through a high speed hammer mill 33 for the sake of uniformity of material only. Since the compaction of the product is by volume only, uniformity of material is extremely important, as will be clear in the description of the final phase of the process. This is why the hammer mill 33 is employed with a 8 screen (64 openings (640the square inch). A common drive means 33' for conveyors 18 and 31 is provided in the apparatus.

The dual air conditioning system referred to above includes the following. A preferably one ton air conditioning unit 34 at the top of the tower or hopper 19 having a cold air delivery pipe 35 delivers cold air into the top of the cooling hopper on the basis of about 600 cfm. In addition to cooling, this upper cold air delivery eliminates blow-back of material due to back pressure in the hopper 19 at the point of entry of the hot material from the conveyor 18. It is desirable that the material fall directly onto the cooling belt means 23 with minimum air agitation.

The main air conditioning unit 36, such as a two and one-half ton capacity air conditioner, is installed in an unheated area 37 externally of the room temperture are 28. The advantage of this is that in cooler climates and seasonal operations, it is more convenient to draw in ambient cold air for cooling rather than using the air conditioner means. However, in certain temperature ranges, it is necessary to warm the intake air to the compressor of A/C unit 36 so that it will run continuously during temperature changes. Therefore, a 3-KW strip heater 39 is installed in the air intake to the unit 36 under control of a thermostat 40, so that the compressor of unit 36 will continue to receive warm air and remain in operation continuously even though the outside temperature is well below the operating range of the compressor. In this manner, a temperature of 56° is maintained in the cooling hopper 19 on a continuous basis. Cold air from the main A/C unit 36 is delivered through a 12 inch insulated duct 41 to and through the cooling hopper 19. However, this 12 inch duct is free of insulation where it spans the hopper 19 to promote cooling by radiation. A smaller 6 inch duct 42 connected in the main duct 41 delivers cold air to the top of the hopper 19 at 43. The duct 41 is reduced to 10 inches at 44 beyond the hopper 19 and is again insulated and the cold air therein is delivered to a high speed enclosed blower 45, from which the cold air is delivered back to the hopper passage 29 at a lower level through the previously described conduit 27 which is preferably 5 inches in diameter. The cold air enters the hopper 19 from the conduit or duct 27 at about 4000 cfm. to produce the required air blast. One reason for employing positive air blast at this point in the process is to break up any material caking which might have occurred during the cooling process and to assure final uniform cooling of the mixture.

Figure 5:
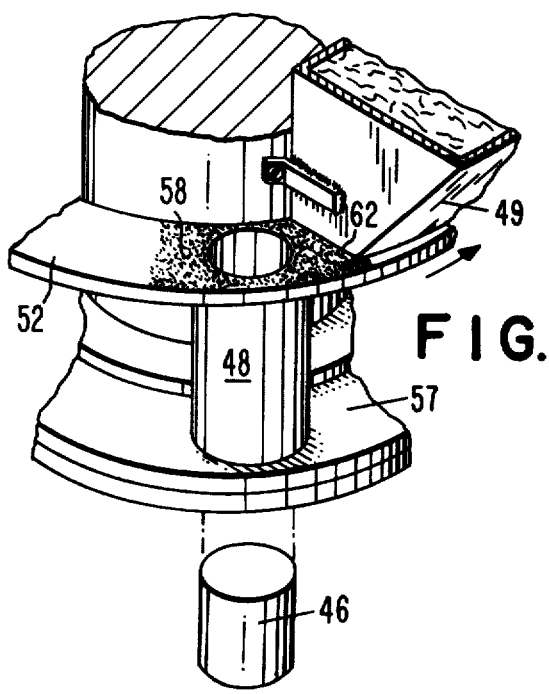

The final essential process step is the compaction of the blended and cooled material into solid preferably cylindrical igniter elements 46, FIG. 5, which are conveniently 1 inch in diameter ×1⅜ inches in length, although the shape and dimensions of the product elements 46 may vary widely under the invention.

Figure 2:
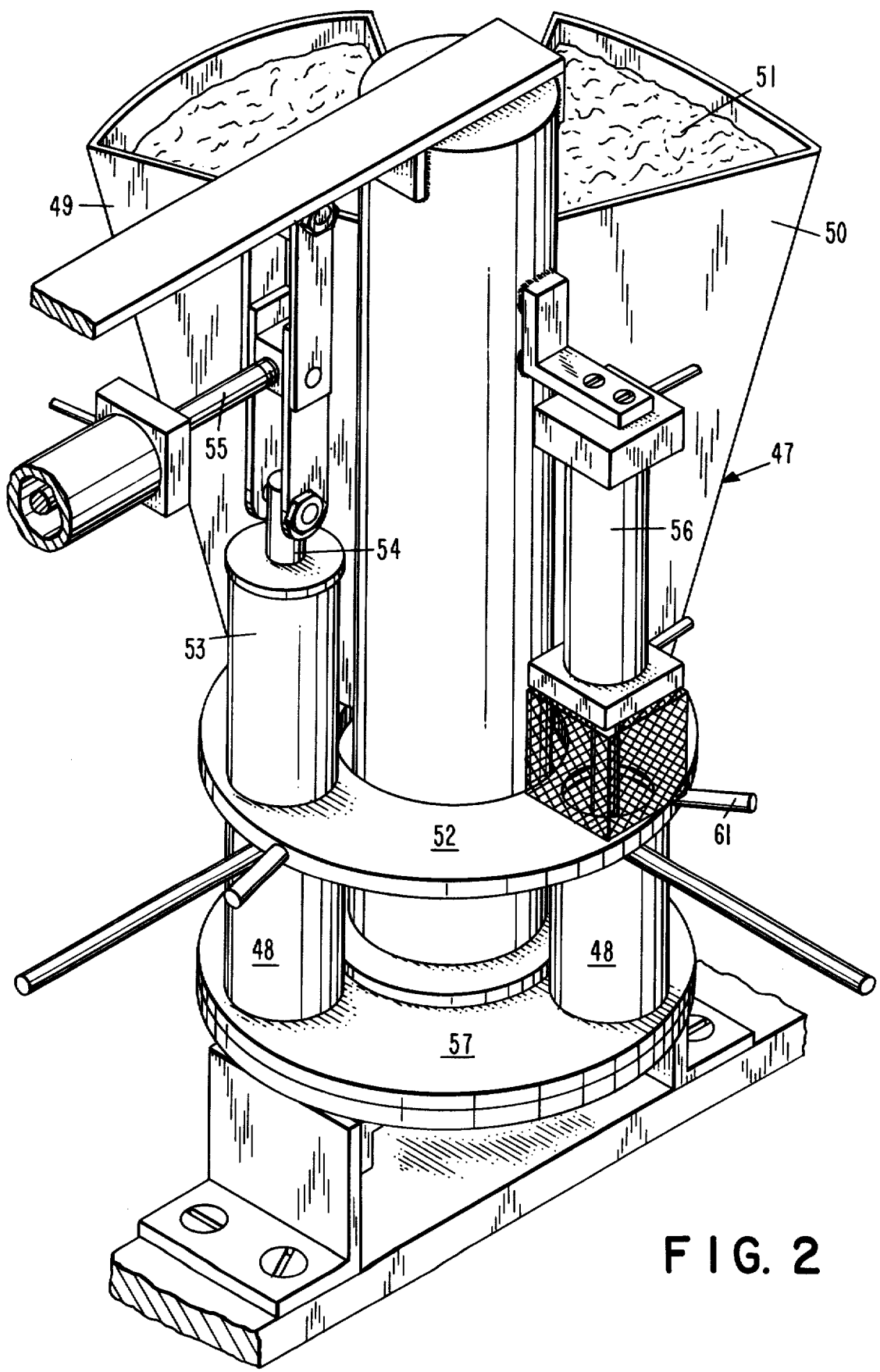
FIG. 2 is a perspective view of product compacting means forming part of the apparatus.

As illustrated in FIGS. 1 and 2, the product compacting apparatus 47 comprises twin compaction chambers 48 or cylinders and twin hoppers 49 and 50 for the blended and cooled mixture of compressed wood sawdust and wax and for additional dry compressed wood sawdust 51 which has been processed through the hammer mill with a No. 12 size screen for uniformity. The sawdust 51 is employed in a unique manner, to be described, as a release agent. The two hoppers 49 and 50 are both equipped with material agitating means, not shown, so that the wax-saturated wood particles and the dry sawdust 51 are kept constantly in motion.

The apparatus 47 includes a turntable 52 which revolves with the compression chambers or cylinders 48, relative to the two hoppers 49 and 50 which are stationary along with the product compression ram 53 having compression plunger 54 and power operating means 55. Also, a compressed product ejection ram 56 is stationary relative to the turntable 52 and cylinders 48 whose compression bores are exactly 1 inch in diameter × 5 inches long.

It was discovered in the development of the compaction apparatus that there was a tendency for a build-up or caking of the compressed material on the lower end of compactor shaft or plunger 54, as well as on the top of stationary plate 57 which constitutes the lower end wall of each compacting chamber or cylinder. This required frequent cleaning away of build-up of material which progressively formed due to slight melting and seapage on both ends of the solid igniter element 46 under compression in the cylinder 48 from the ram 54 at approximately 22,000 psi. Through experimentation it was learned that this slight melt or seapage could be absorbed by a thin layer of compressed wood sawdust which then became an integral part of the solid igniter element 46.

Figure 3:
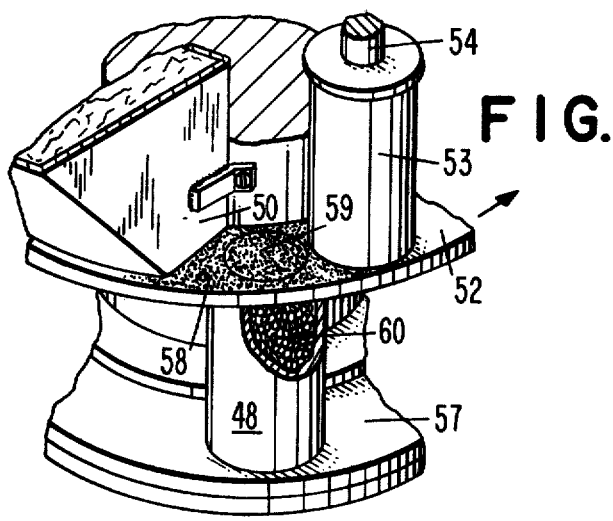
FIGS. 3, 4 and 5 are fragmentary perspective views of portions of the compacting mechanism depicting the dry sawdust release agent.

Consequently, in the production apparatus 47, as the turntable 52 and associated parts are indexed, a thin layer of the sawdust 51 is deposited and spread evenly on the top face of the turntable as indicated at 58, FIG. 3, and this sawdust also covers the top end 59 of the blended and saturated material 60 in the compression chamber of cylinder 48 to be compressed into one of the solid fuel elements 46. During compression by the plunger 54, only the sawdust 59 at the top 1 inch diameter circular area covering the material 60 is removed leaving the remainder of the sawdust 58 intact on the table as the table rotates past the ejector 56 and before the particular cylinder 48 enters the hopper 49 for refilling. The remaining sawdust 58 is brushed into the bottom of the cylinder chamber by the edge of the hopper thereby creating a thin coating or layer of sawdust on the bottom wall of the 5 inch compression cylinder before it is charged with a new load of the loose material to be compacted from the hopper 49. Thus, when the compression cycle is completed, there is a release agent in the form of dry compressed wood sawdust on both ends of the solid element 46 with no build-up or caking problem on either end. Thus unique release agent feature is very important in terms of rapid production without the necessity for frequent interruptions to clean or scrape the parts.

The sawdust hopper 50 employs a spring-loaded sifter means at its bottom, not shown, which is tripped automatically by a radially projecting pin element 61 on the turntable 52 so that the sawdust 58-59 will be evenly delivered.

Figure 4:
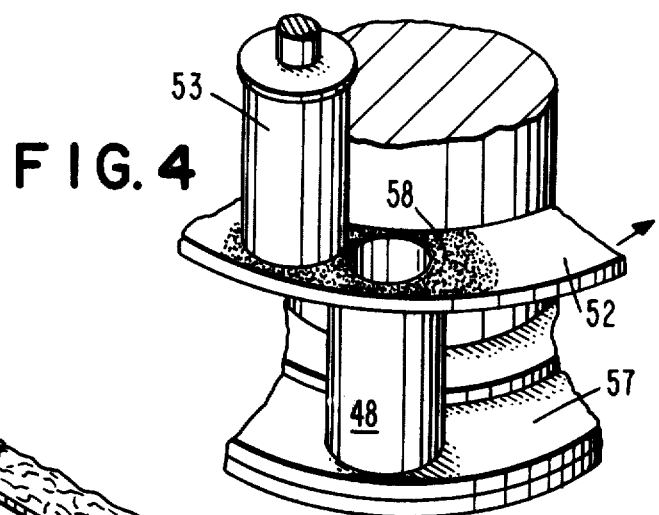

FIG. 3 depicts the compression cylinder 48 charged with material immediately before compression. FIG. 4 shows the same following the compression stroke but before ejection with sawdust 58 remaining on the turntable on each side of the compression chamber bore. FIG. 5 shows the apparatus immediately after ejection of the product 46 and note should be taken of the sawdust layer 58 on the turntable 52 immediately before the cylinder passes under the hopper 49 for refilling with material to be compressed. It is at this time that the lower edge 62 brushes or sweeps sawdust into the bottom of the cylinder 48, as described, to produce the sawdust release agent or layer on the lower end of the element 46.

It is believed that the method of producing the solid fuel product, the nature of the product and the apparatus may now be understood by one skilled in the art without the necessity for further description herein.

The invention offers a unique method for producing a very superior solid fuel product possessing capabilities as an igniter element unknown in the prior art and surpassing the prior art. The product is thought to possess wider utility in the field of solid fuel but as an igniter element it is ideal.

Again, the key to the invention is the utilization of fine sawdust derived from compressed wood products of the type identified so as to have substantially zero bound moisture. This by-product is processed with the identified liquid wax at a critical elevated temperature to achieve true and full saturation of the sawdust particles with wax and not a mere external coating of particles. No adhesive binders are required for successful compaction or briquetting. The compressed product is cool to the touch upon ejection from the compression cylinder proving that it is moisture-free, and if this were not the case, heat would be generated as with the formation of the parent compressed wood product formed originally from wood particles having bound moisture in their cells as well as free moisture.

The process is efficient and economical. The raw materials utilized are readily available and the compressed wood sawdust is essentially a waste product and therefore free wherever parent compressed wood is being sawed or ground for any purpose.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method for producing a solid fuel element useful as an igniter in a solid fuel package comprising the steps of: blending approximately equal parts by weight of dry powdery wood particles at room temperature derived from the sawdust of cell bound moisture free compressed wood with refined liquid paraffin wax having a melting point of approximately 125° F. preheated to approximately 350° F. to an ultimate blended material temperature of approximately 250° F., thereby ridding the wood particles of free moisture and activating the molecules of the wood particles and liquid wax sufficiently to cause the wood particles to be completely saturated with the liquid wax, cooling the blended material while conveying it in a thin layer slowly through a cooling chamber until the blended material is at a temperature of approximately 56° F., milling the blended and cooled material, and then compacting the material in a rigid compression chamber under a pressure of approximately 22,000 psi to form a dry solid fuel element.

2. The method as defined in claim 1, and the additional step of causing the blended material to be airborne in a cooling air stream while within the cooling chamber.

3. The method as defined in claim 1, and the additional step of applying a release agent in the form of a thin layer of said dry powdery wood particles at room temperature to opposite ends of the mass of material being compacted in said compression chamber.

* * * * *